United States Patent [19]

Krebs

[11] Patent Number: 4,810,171
[45] Date of Patent: Mar. 7, 1989

[54] REGULATOR FOR AN ADJUSTABLE HYDROSTATIC MACHINE

[75] Inventor: Clemens Krebs, Tübingen, Fed. Rep. of Germany

[73] Assignee: Brueninghaus Hydraulik GmbH, Horb, Fed. Rep. of Germany

[21] Appl. No.: 133,021

[22] Filed: Dec. 15, 1987

[30] Foreign Application Priority Data

Dec. 30, 1986 [DE] Fed. Rep. of Germany ....... 3644769

[51] Int. Cl.$^4$ ............................................... F04B 1/26
[52] U.S. Cl. ........................................ 417/218; 60/447
[58] Field of Search .................... 417/212, 216–221; 60/447

[56] References Cited

U.S. PATENT DOCUMENTS

| 3,384,019 | 5/1968 | Ifield et al. | 417/218 |
| 3,407,738 | 10/1968 | Bosch | 417/218 |
| 4,077,744 | 3/1978 | Pensa | 417/218 |
| 4,518,321 | 5/1985 | Schniederjan | 417/218 |
| 4,639,195 | 1/1987 | Norskau et al. | 417/218 X |
| 4,668,171 | 5/1987 | Beutler et al. | 417/218 X |

FOREIGN PATENT DOCUMENTS

| 2363480 | 6/1975 | Fed. Rep. of Germany | 417/219 |
| 3408105 | 9/1985 | Fed. Rep. of Germany | 417/218 |
| 99082 | 6/1984 | Japan | 417/216 |

*Primary Examiner*—William L. Freeh
*Attorney, Agent, or Firm*—Scully, Scott, Murphy & Presser

[57] ABSTRACT

A regulator for an adjustable hydrostatic machine (1) having a hydraulic servo controller (4) for continuous variation of the displacement volume, with a valve device (16, 18) for controlling or regulating the servo controller (4) in dependence on the displacement volume and/or working pressure of the hydrostatic machine (1) and a second regulating valve (15) for regulating the servo controller (4) in dependence on the displacement volume, is arranged so that it can be operated without significant regulating losses in the working stream. This is done by providing a third control valve (48), controlled in dependence on the control movement of the servo controller (4), to control the pressure acting on the second regulating valve (15).

13 Claims, 3 Drawing Sheets

REGULATOR FOR AN ADJUSTABLE HYDROSTATIC MACHINE

TECHNICAL FIELD OF THE INVENTION

The invention relates to a regulator for an adjustable hydrostatic machine having a hydraulic servo controller for continuous variation of the displacement volume, a valve device for controlling or regulating the servo controller in dependence on the displacement volume and/or working pressure of the hydrostatic machine, and a second regulating valve for regulating the servo controller in dependence on the displacement volume.

BACKGROUND OF THE INVENTION AND PRIOR ART

A control device of this kind serves to match the displacement or take-up volume of the hydrostatic machine to the operating conditions. For this purpose the control device can have, as well as a delivery flow regulator, a pressure regulator and/or a power regulator.

It is known for a delivery flow regulator to include a flow valve in the form of a throttle valve which, in order to vary the through-flow, is adjustable so that the servo controller is acted on in dependence on the volumetric flow taken up by the load or loads.

A regulating device of this kind is described and shown in DE-OS No. 33 45 264. In the case of this known arrangement the control of the flow valve, which contains a so-called delivery flow pressure balance, takes place in dependence on the pressure difference at a throttle position in the working line of the hydraulic transmission. This arrangement has the disadvantage that regulation of the delivery flow involves high regulation losses at the throttle in the working stream.

OBJECT OF THE INVENTION

The object of the invention is to design a regulating device of the kind indicated above in such a way that it can be operated in the working stream without any significant regulation losses.

BRIEF DESCRIPTION OF THE INVENTION

This object is achieved by providing a third control valve, controlled in dependence on the controlling movement of the servo controller, for controlling the pressure acting on the second regulating valve.

In the arrangement according to the invention the delivery flow regulator is directly controlled in dependence on the adjusting displacement of the servo control device, which delivers a value corresponding to the volume flow taken up by the load or loads. The control valve according to the invention controls the pressure acting on the second control valve or the delivery flow regulator in dependence on this value. The arrangement according to the invention is characterised by simplicity and can be realised without substantial additional costs and without the need for a throttle in the working line which gives rise to the disadvantages mentioned above.

The arrangement is characterized in that the control piston of the servo controller, or a part attached thereto, has a control surface oblique to its direction of motion, on which the valve spool of the third control valve or a driving member thereof, abuts. This arrangement presents a practical measure for transmitting the value corresponding to the volume flow taken up by the load or loads to the third control valve according to the invention. It is possible to hold the valve spool of the control valve directly in contact with the oblique control surface or to interpose a movement transfer member, e.g. a pre-control valve.

Within the scope of the invention it is possible to employ, for the control of the second control valve or the delivery flow regulator by means of the third control valve of the invention, a pressure that is branched off from the working pressure or an auxiliary pressure in that the third control valve is arranged in a line carrying a control or auxiliary pressure that is constant and can be produced for example by an auxiliary pump. Within the scope of the invention, however, it is also possible to employ the working pressure, either directly or reduced, to control the second control valve or the delivery flow regulator, though this can lead to certain falsifications in the characteristic curves which are dependent on the working pressure.

The construction is characterised in that the pressure ($p_{H1}$) in the line that includes the third control valve can be varied by means of a fourth control valve, which provides precise control of the flow valve possible and is therefore particularly suitable on functional grounds.

The arrangement is characterised in that the fourth control valve can be controlled directly or by means of a control line carrying a variable control pressure ($p_{St}$) which makes it possible to control the delivery at will by influencing the control or auxiliary pressure by means of an actuating member, e.g. a gas pedal.

The present invention is also characterised in that adjustable limits on the control movement, preferably in the form of stops, are associated with the third or fourth control valve. Moreover, the fourth control valve and the third control valve can be integrated to form a common control valve which has a control member parallel to its valve spool. The third or fourth control valve can be screwed into its carrier, and one of the two stops is determined by the depth to which it is screwed therein, and the second of the two stops is formed by an adjusting screw. Moreover, the stops can be disabled or overridden at will, and an adjustable stop is provided to limit the movement of the control piston in at least one direction. These features make possible adjustable, and in particular hydraulic, limitation of the travel of the servo control device, and also practical and compact arrangements for such a control valve or for one performing two control functions. Thus the features of disabling or overriding the stops and providing an adjustable stop to limit the movement of the control piston make it possible to have four adjustable end-of-travel settings or delivery settings.

The invention will now be described, by way of example, in more detail with reference to preferred embodiments shown in diagrammatic and/or simplified drawings, in which FIG. 1 shows a regulating device according to the invention for an adjustable hydrostatic machine;

DETAILED DESCRIPTION OF PREFERRED EMBODIMENTS OF THE INVENTION

Figure 1:
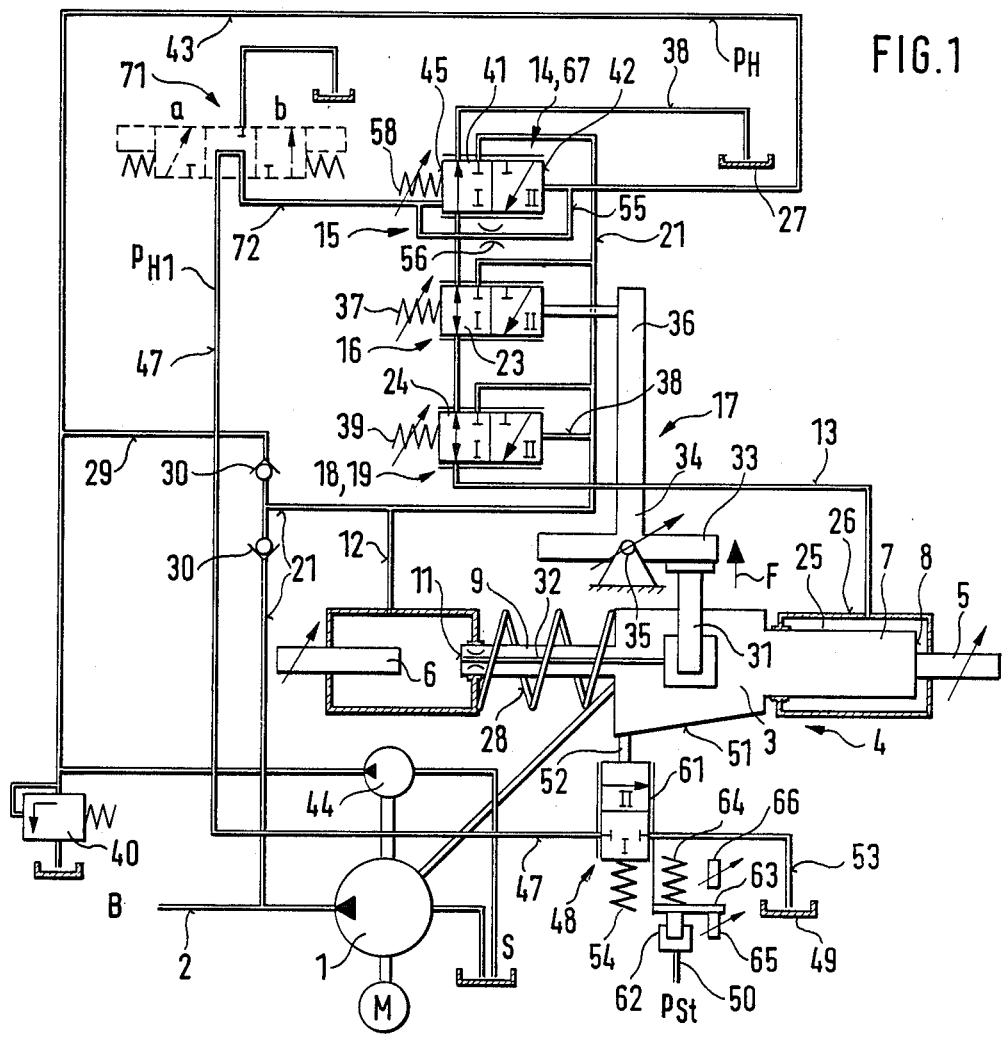

In the embodiments to be described by way of example the hydrostatic machine comprises a hydro-pump 1 of adjustable delivery volume that sucks from a supply container S and feeds a load B (not shown) via a working line 2 of an open circuit hydrostatic transmission. The working pressure in the working line 2 is determined by the load. The delivery volume of the hydro-pump 1 is proportional to the setting of the control piston 3 of a hydraulic servo control device indicated generally by 4 and having an adjustable maximum stop 5 and an adjustable minimum stop 6. If the control piston 3 is up against the mechanical maximum stop, the hydro-pump 1 delivers a maximum volume. If the control piston 3 is up against the mechanical minimum stop, the delivery volume is 0. The control piston 3 is constructed as a differential piston with a piston 7 with a large working area 8 and a piston 9 with a small working area 11. The small working area 11 is permanently acted on by the working pressure through a section 12 of a hydraulic line. The large working area 8 is permanently acted on by a regulating pressure through a line section 13 that is regulated by means of a flow valve 15 associated with a delivery flow regulator 14, an output control valve 16 of an output regulator 17 and a pressure regulating valve 18 of a pressure regulator 19, which are arranged in series in the associated hydraulic line, in which the regulating pressure predominates in the section 13 and the working pressure in the section 21. If the flow valve 15, the output control valve 16 and the pressure regulating valve 18 are all in position I, the working chamber 25 associated with the large working area 8 within a cylinder indicated by 26 is relieved to the reservoir 27. The control piston 3 is then pressed hydraulically against the maximum stop 5. In the pressureless state the control piston 3 is likewise pressed by a spring 28 against the maximum stop 5.

Movably guided within the control piston 3 and transverse thereto is a pressure piston 31 which is permanently subjected to the working pressure via a longitudinal passage 32 in the small piston 9. The pressure piston 31 acts on one lever arm 33 of a bent lever 34 with a force F that is proportional to the working pressure. The pivot axis of the bent lever 34 is adjustable parallel to the direction of movement of the control piston 3 for the purpose of tuning and is arranged substantially so that the pressure piston 31 presses precisely on the pivot axis 35 at delivery volume 0. The effective lever arm of the force F—relative to the pivot axis 35—is therefore proportional to the delivery volume of the hydro-pump 1. Consequently the turning moment applied to the bent lever 34 is proportional to the driving power of the hydro-pump 1 (at a constant driving speed). The other lever arm 36 of the bent lever 34 moves the valve spool 23 of the output control valve 16 against a spring 37, preferably of adjustable strength.

When there is excess power output the valve spool 23 of the output control valve 16 assumes the switching position II and connects the section 13 of the line with the section 21, whereby the control piston 3 is displaced towards the minimum stop 6, the delivery volume of the hydro-pump 1 decreases and the power output falls. When the power output is too low the valve spool 23 assumes the switching position I and connects the section 13 of the line via a section 38 with the reservoir 27, whereby the control piston 3 is displaced towards the maximum stop 5, the delivery volume of the hydro-pump 1 increases and the power output rises.

The valve spool 24 of the pressure regulating valve 18 is connected via a line section 38 with the line section 21 that conducts the working pressure. A spring 39, preferably of variable strength, maintains the equilibrium in the pressure regulation of the hydraulic force. When the pressure is too high the valve spool 24 assumes the switching position II, whereby the delivery volume adjusting member of the hydro-pump 1 swings inwards. When the pressure is too low the valve spool 24 takes up the switching position I, in which the adjusting member swings out.

The flow valve 15 has a so-called pressure balance. The valve spool 41 of the flow valve 15 is acted on its side indicated by 42 by an auxiliary pressure $p_H$, present in a hydraulic line 43 leading to this side 42 and produced by an auxiliary pump 44, which is likewise driven by the motor M. A pressure limiting valve in the line 43 is indicated by 40. On the opposite side, indicated by 45, the valve spool 41 is acted on by a controlled auxiliary pressure $p_{H1}$ in a hydraulic line 47. The controlled auxiliary pressure $p_{H1}$ is controlled through a control valve 48 that controls the auxiliary pressure $p_{H1}$ by relieving to a pressureless container 49 in dependence on the position of the control piston 3 and the control pressure $P_{St}$ in line 50 or the displacement of the control sleeve 61. For this purpose the control piston 3 has a control surface 51 oblique to its longitudinal axis, on which the valve spool 52 of the control valve 48 abuts, supported by the spring 54, and slides when the control piston 3 is moved, and thereby is correspondingly displaced for the purpose of control of the auxiliary pressure $p_{H1}$. By this means the passage between the line 47 and the line section 53 leading to the reservoir is correspondingly opened or closed, whereby the pressure in the line 47 is controlled in dependence upon the delivery volume. A first control of this auxiliary pressure $p_{H1}$ already results from a line section 55 which bypasses the flow valve 15 and connects the line 43 with the line 47 and has a throttle 56. The spring 58 acting on the side 45 of the valve spool 41 is arranged so that at a particular pressure difference $\delta p$ there is an equilibrium of forces. The $\delta p$ at the throttle 56 in the bypass line 55 is produced by the oil flow through the control valve 48.

The line 43 is connected to the line 21 through a line section 29, a non-return valve 30 opening towards the line 21 being arranged in the line section 29. A non-return valve 30 is also provided in the line 21 between the branch and the working line 2.

The flow valve 15, the output control valve 16 and the pressure regulating valve 18 are proportional valves.

Integrated in the control valve 48 is a second valve function that makes possible a further control of the auxiliary pressure $p_{H1}$. This is indicated in FIG. 1 by a control sleeve 61 that can be adjusted as desired by an adjusting member. The adjusting member in the present embodiment is formed by a cylinder-piston unit 62 that is acted on by a variable control pressure $p_{St}$ in a control line 50, forms with the control sleeve 61 a unit in the form of an adjusting rod 63, and is acted on against the cylinder-piston unit 62 by a spring 64. The control sleeve 61 is thus adjustable as desired against the spring 64, whereby the auxiliary pressure $p_{H1}$ and thus the flow valve 15 can be influenced for the purpose of adjusting the delivery volume. The control of the control pressure $p_{St}$ is performed by a control member (not shown) for example by a valve that is adjustable by an adjusting member for speed (gas pedal). On increasing the control pressure $p_{St}$ the control valve 48 takes up the position II in which the passage to the reservoir is opened.

The control sleeve 61 or the adjusting rod 63 are provided with two adjustable stops 65, 66, which limit the displacement movement of the control sleeve 61.

In the case of a control movement of the control piston 3 towards the right the auxiliary pressure $p_{H1}$ in the line 47 to the line section 53 diminishes because of the displacement of the control valve 48 brought about by the control surface 51. The pressure difference $\delta p$ resulting at the throttle 56 sets the valve spool 41 in its position II so that through the line 13 the large working area 8 of the control piston 3 is acted on by an increased regulating pressure. The control piston 3 is thereby moved towards the minimum stop 5. Thus the valve spool 52 of the control valve 48 is pushed back, whereby the associated control edges close. In the case of a small opening of the control edges, which produces at the throttle 56 precisely the pressure difference $\delta p$ that holds the valve spool 41 of the flow valve 15 in equilibrium against the spring 58, the control piston 3 takes up its regulating position. This is a positional regulation of the control piston 3 with balancing of displacement in the control valve 48 and of hydraulic force at the pressure balance already described, that is located in the flow valve 15 and generally indicated by 67. The movement of the control piston 3 is proportional to the displacement of the control sleeve 61 or to the control pressure $p_{St}$, as can also be seen with reference to the characteristic curves in FIG. 2. The maximum stop 65 and the minimum stop 66 thus give a limitation of the travel of the control piston 3.

The maximum stop 65 and the minimum stop 66 can be put out of action or overridden, whereby the control piston 3 can be moved further against the maximum stop 5 or the minimum stop 6. This can be brought about by movement or putting out of action of the stops 65, 66.

In the present embodiment a directional control valve 71, merely indicated, is provided for this purpose, shown in its open position. The minimum stop 66 can be overridden as far as the minimum stop 6 by relieving the line section 72 that lies between the flow valve 15 and the directional control valve 71 (position b of the directional control valve 71) to the reservoir 69. The maximum stop can be overridden by closing the line section 72 (position a of the directional control valve 71) as far as the maximum stop 5. This makes possible a hydraulic limitation of travel with four limiting positions for the control piston 3, and also a continuous adjustment between the stops 65, 66.

The output regulator 17 and pressure regulator 19 can likewise override any position of the control piston 3 that is pre-determined by the limits of travel. The control valve 48 has a particular design shown in FIG. 3. The control piston 3 and the associated housing 73 of the control device 4 are indicated. An adjusting sleeve 75 of the control valve 48 is screwed into a threaded hole in the housing 73 of the control device 4, the depth to which it is screwed in being fixed by means of a lock nut 70 arranged on the adjusting sleeve 75 which can be drawn tight against a jacket ring 74 abutting on the housing 73. The hollow cylindrical control sleeve 61, in which the valve spool 52 is guided in an axially displaceable manner, is itself axially displaceable in the adjusting sleeve 75. The valve spool 52 projects through the screwing in end 76 of the adjusting sleeve 75 and is in contact with the oblique control surface 51 of the control piston 3, against which it is pre-stressed by the pressure spring 54 which is supported on the control sleeve 61. The control sleeve 61 is acted on in the opposite direction by the pressure spring 64, which is arranged in a recess 79 in the adjusting sleeve 75, with one end abutting on a shoulder of the adjusting sleeve 75 and at its other end acting against a collar on the control sleeve 61. The pressure spring 64 pre-stresses the control sleeve 61 against a threaded screw 81 that forms the maximum stop 65, is displaceable and can be fixed by the threaded nut arranged on the screw thread 81. The minimum stop 66 is formed by an internal shoulder 83 on the adjusting sleeve 75 that cooperates with the end face 84 of the control sleeve 61 that faces away from the maximum stop 65. The adjustment of this stop is determined by the depth e to which the adjusting sleeve 75 is screwed in the housing 73. The screw thread 81 is located on a screw part 85 that is screwed on to the adjusting sleeve 75.

The cap part 74 has a line connection 86 for the line 50. The control pressure pSt is transmitted through an annular passage 87 and a passage 88 in the recess 79 closed by the screw part 85, where it is able to move the control sleeve 61 against the minimum stop 66, namely the internal shoulder 83. The controlled auxiliary pressure pH1 is transmitted via the connecting line 77 and corresponding passages 91, 92, 93, to the control edge 97, in or between the control sleeve 61 and the valve spool 52, whereby the passage between the line 47 and 53 to the substantially pressureless interior space 49 of the housing 73 is controllable in the manner already described.

60 indicates a passage for relieving the pressure in the space that receives the spring 54.

Figure 3:
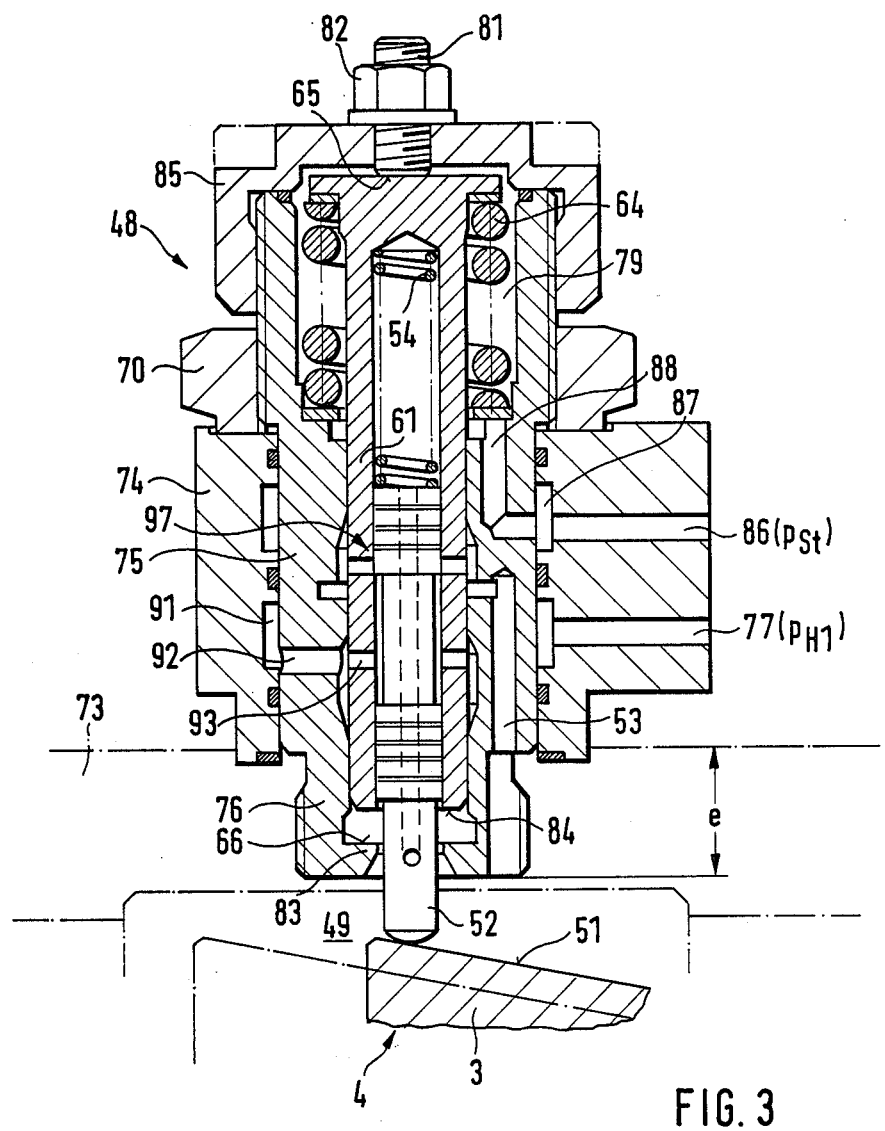
FIG. 3 shows a control valve according to the invention in axial section.

The control valve 48 shown in FIG. 3 is functionally connected to the directional control valve 71, in position b of which the control valve 48, including the stops 65, 66, is put out of action in the arrangement according to FIG. 3.

Figure 2:
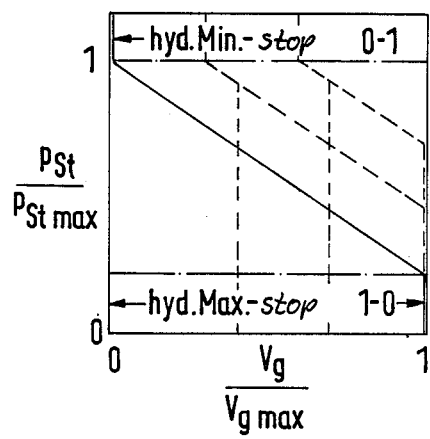
FIG. 2 shows the characteristic curve of the regulating device.

The embodiment described above is normally so arranged that in the pressureless state the hydro-pump 1 and the control piston 3 are in their positions for maximum delivery volume. Within the scope of the invention it is also possible, for particular applications or reasons of safety, to make the arrangement such that the regulating device is in its position for minimum delivery volume in the pressureless state. In such a case the arrangement or direction of operation of the cylinder-piston unit 62 and the associated spring 64, and also the characteristic lines according to FIG. 2, are reversed.

Figure 4:
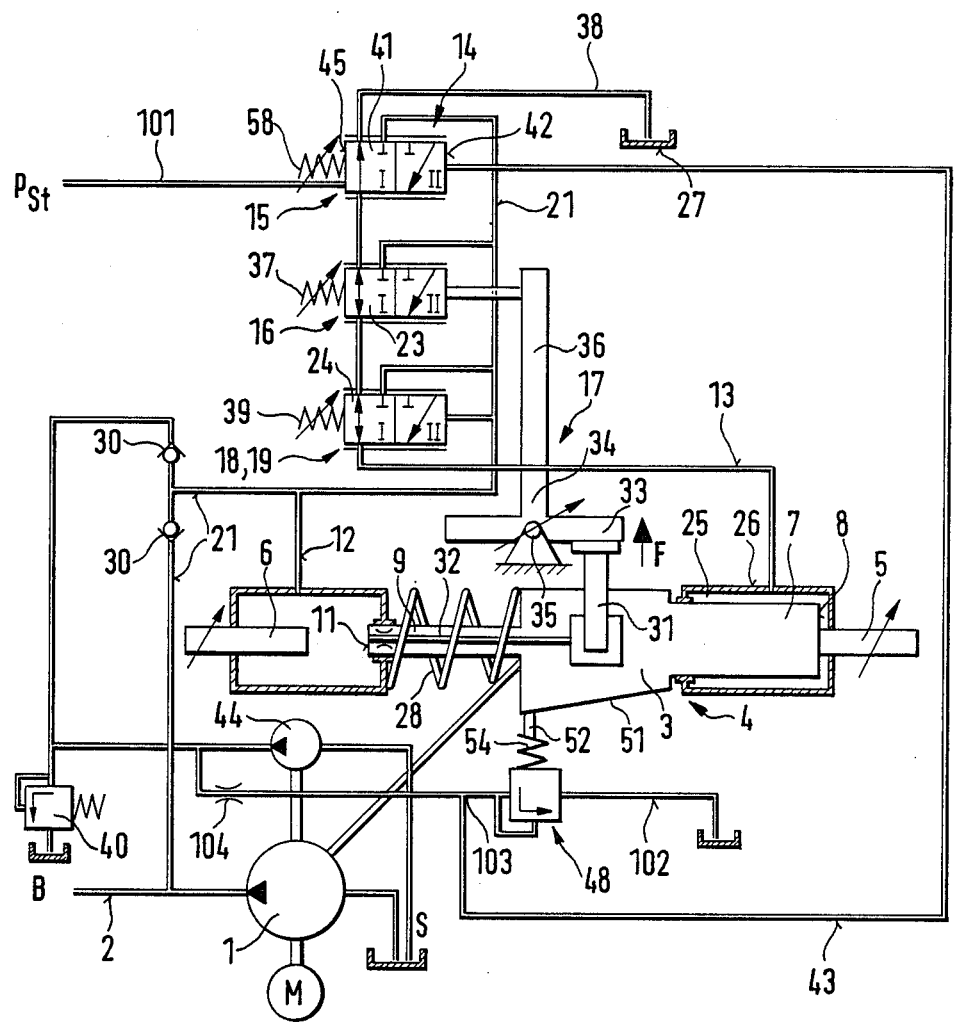
FIG. 4 shows a control valve arranged according to the invention as a further embodiment.

The embodiment according to FIG. 4 differs from that described above essentially in that there are no other limiting stops (corresponding to 65, 66) than the maximum and minimum stops 5, 6. In addition control action by means of the control pressure $p_{St}$ on the control valve 48 is not provided. In this embodiment the control pressure $p_{St}$ acts through a hydraulic line 101 directly on the flow valve 15. Here the control valve 48 acts on the line 43 that connects the auxiliary pump 44 with the flow valve 15. For controlled relief of the line 43 the control valve 48 is arranged in a line section 102 that branches off from the line 43 and leads to a pressureless container. The branch 103 is situated between a throttle 104 and the flow valve 15. All other parts of this regulating device correspond to the first embodiment and are also correspondingly numbered. The flow valve 15 in this embodiment has a throttle 56.

The valve 48 produces an actual pressure $p_{H1}$ in the line 43 that is proportional to the position of the control piston 3. At the flow valve 15 the actual pressure $p_{H1}$ is compared with the value $p_{St}$. The force equilibrium is set up by means of the spring 58.

I claim:

1. A regulating device for regulating the throughput volume of a hydrostatic machine, comprising:
   a. a hydraulic servo control device (4) for continuous variation of the throughput volume of a hydrostatic machine;
   b. a regulating valve (15) in a hydraulic line (13,21) leading to the servo control device (4), for controlling the servo control device (4) in dependence on the throughput volume;
   c. A valve device (16) for regulating the servo control device (4) in dependence on the throughput volume and the working pressure of the hydrostatic machine, and a valve device (18) for regulating the servo control device (4) in dependence on the working pressure of the hydrostatic machine;
   d. characterized in the provision of a control valve (48) for controlling the pressure acting on the regulating valve (15), which is adjusted in dependence on the controlling movement of the servo control device (4).

2. A regulating device according to claim 1, characterised in that said control valve is arranged in a control valve line carrying a control or an auxiliary pressure.

3. A regulating device according to claim 1, characterised in that a control piston of said servo control device is coupled to a control surface oblique to its direction of motion, which is coupled to a valve spool of said control valve.

4. A regulating device according to claim 3, characterised in that an adjustable stop limit is provided to limit the movement of the control piston in at least one direction.

5. A regulating device according to claim 3, characterised in that said valve device (16) for regulating the servo control device (4) in dependence on the throughput volume and the working pressure of the hydrostatic machine (output regulator) is arranged in series between said regulating valve (15) for regulating the throughput volume and said valve device (18) for regulating the servo control device (4) in dependence on the working pressure of the hydrostatic machine (pressure regulator).

6. A regulating device according to claim 1, characterised in that the pressure produced by said control valve can be varied by a further control valve.

7. A regulating device according to claim 6, characterised in that said further control valve can be controlled directly, or by a control line carrying a variable control pressure.

8. A regulating device according to claim 6, characterised by the provision of adjustable stop limits on the control movement of said control valve or said further control valve.

9. A regulating device according to claim 8, characterised in that said adjustable limits can be disabled.

10. A regulating device according to claim 6, characterised in that said further control valve and said control valve are integrated into a common control valve.

11. A regulating device according to claim 10, characterised in that said common control valve has a control member arranged parallel to its valve spool.

12. A regulating device according to claim 11, characterised in that said control valve or further control valve s screwed into a carrier, and one of said adjustable limits is determined by the depth to which it is screwed in.

13. A regulating device according to claim 11, characterised in that a second of said adjustable limits is formed by an adjusting screw.

* * * * *

UNITED STATES PATENT AND TRADEMARK OFFICE
CERTIFICATE OF CORRECTION

PATENT NO. : 4,810,171

DATED : March 7, 1989

INVENTOR(S) : Clemens Krebs

It is certified that error appears in the above-identified patent and that said Letters Patent is hereby corrected as shown below:

Column 8, line 34, Claim 12: "s screwed" should read as --is screwed--

Signed and Sealed this

Seventeenth Day of October, 1989

Attest:

DONALD J. QUIGG

Attesting Officer

Commissioner of Patents and Trademarks